United States Patent [19]

Brock et al.

[11] Patent Number: 4,646,788

[45] Date of Patent: Mar. 3, 1987

[54] ROTARY DOBBY

[75] Inventors: Josef Brock, Viersen; Paul Surkamp, Kempen, both of Fed. Rep. of Germany

[73] Assignee: W. Schlafhorst & Co., Monchen-Gladbach, Fed. Rep. of Germany

[21] Appl. No.: 725,014

[22] Filed: Apr. 18, 1985

[30] Foreign Application Priority Data

Apr. 18, 1984 [DE] Fed. Rep. of Germany ....... 3414639

[51] Int. Cl.[4] .............................................. D03C 1/00
[52] U.S. Cl. .................................... 139/76; 139/66 R
[58] Field of Search ............................... 139/76, 66 R

[56] References Cited

U.S. PATENT DOCUMENTS

| | | | |
|---|---|---|---|
| 3,804,128 | 4/1974 | Amigoes | 139/66 R |
| 4,301,905 | 11/1981 | Brock | 139/76 |
| 4,354,531 | 10/1982 | Surkamp | 139/66 R |

FOREIGN PATENT DOCUMENTS 2841279 11/1979 Fed. Rep. of Germany .... 139/66 R

Primary Examiner—Werner H. Schroeder
Assistant Examiner—Joseph S. Machuga

Attorney, Agent, or Firm—Herbert L. Lerner; Laurence A. Greenberg

[57] ABSTRACT

A rotary dobby for moving a shaft includes a connecting rod connected to the shaft to be moved, the connecting rod having two mutually-opposite wedge detents disposed thereon, an eccentric disk carried on the connecting rod having a wedge guide extended radially in the eccentric disk, a drive shaft assembly having at least one detent groove formed therein, a coupling wedge disposed between the drive shaft assembly and the eccentric disk, the coupling wedge having an open shifting groove formed therein, two control pieces engageable in the shifting groove, two control rods each being connected to a respective one of the control pieces and being controlled according to a given pattern for pushing one of the control pieces into the shifting groove and for pushing the coupling wedge alternately into the detent groove along the length of the wedge guide when the drive shaft assembly is not rotating and into one of the two wedge detents, and a detent device disposed on the connecting rod at and associated with the wedge detents functioning in cooperation with the eccentric disk for maintaining the connecting rod and the eccentric disk in a zero position for receiving the coupling wedge.

6 Claims, 15 Drawing Figures

ROTARY DOBBY

The invention relates to a rotary dobby for moving a shaft, comprising a connecting rod connected to the shaft to be moved, the connecting rod having two mutually-opposite wedge detents disposed thereon, an eccentric disk carried on the connecting rod having a wedge guide extended radially in the eccentric disk, a drive shaft assembly having at least one detent groove formed therein, a coupling wedge disposed between the drive shaft assembly and the eccentric disk, the coupling wedge having an open shifting groove formed therein, two control pieces engageable in the shifting groove, and two control rods each being connected to a respective one of the control pieces and being controlled according to a given pattern for pushing one of the control pieces into the shifting groove and for pushing the coupling wedge alternately into the detent groove along the length of the wedge guide and into one of the two wedge detents.

In rotary dobby or heald machines of this type, the danger exists of friction, and therefore increased wear taking place at the lateral surfaces of the coupling wedge and the coupling wedge detents, while shifting from a lower shed position to a higher shed position, or conversely. This is because the zero position is not securely defined and a relative motion between the crank or connecting rod and the eccentric disk can consequently occur during the shifting of the wedge.

It is accordingly an object of the invention to provide a rotary dobby, which overcomes the hereinafore-mentioned disadvantages of the heretofore-known devices of this general type, and to make certain, that the shifting is performed without wear and without any reduction of operational reliability.

With the foregoing and other objects in view, there is provided, in accordance with the invention, a rotary dobby for moving a shaft, comprising a connecting rod connected to the shaft to be moved, the connecting rod having two mutually-opposite wedge detents disposed thereon, an eccentric disk carried on the connecting rod having a wedge guide extended radially in the eccentric disk, a drive shaft assembly having at least one detent groove formed therein, a coupling wedge disposed between the drive shaft assembly and the eccentric disk, the coupling wedge having an open shifting groove formed therein, two control pieces engageable in the shifting groove, two control rods each being connected to a respective one of the control pieces and being controlled according to a given pattern for pushing one of the control pieces into the shifting groove and for pushing the coupling wedge alternately into the detent groove along the length of the wedge guide and into one of the two wedge detents, and an automatic zero setting apparatus of the connecting rod for the wedge detents functioning in cooperation with the eccentric disk for maintaining the connecting rod and the eccentric disk in a zero position for receiving the coupling wedge.

In accordance with another feature of the invention, the drive shaft assembly includes another disk having the detent groove formed therein. It is accordingly ensured that during the shifting of the coupling wedge, the connecting rod and therefore the eccentric disk as well cannot leave the zero position which has been attained under the force of gravity.

In accordance with an additional feature of the invention, the automatic zero setting apparatus includes an engageable and disengageable detent device supported in the connecting rod, the detent device having detents for the coupling wedge and being engageable and disengageable by the eccentric disk. In this way it is made certain that the detent device is not engaged before it is in the right acceptance position for the coupling wedge, until the zero position is reached and is secured by a temporary arrest.

In accordance with an added feature of the invention the eccentric disk includes a control element functioning in cooperation with the detent device of the connecting rod. Such a control element can perform the engagement and disengagement of the detent device, as well as the locking of the zero position.

In accordance with a further feature of the invention the detent device of the connecting rod includes a zero setting detent functioning in cooperation with the control element of the eccentric disk. For instance, the above-mentioned control element can engage in such a zero setting detent.

In accordance with still another feature of the invention, the detent device of the connecting rod is in the form of a spring-loaded swing arm cooperating with a stop. For example, such a swing arm is moved slightly away from the coupling wedge for disengagement and is moved toward the coupling wedge for engagement.

In accordance with a concomitant feature of the invention, the control element is a roller rotatably supported on the eccentric disk.

Among others, the invention provides the advantage of preventing disturbances and wear due to the shifting of the coupling wedge, and therefore the invention contributes to the operational reliability of the rotary dobby.

Other features which are considered as characteristic for the invention are set forth in the appended claims.

Although the invention is illustrated and described herein as embodied in a rotary dobby, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
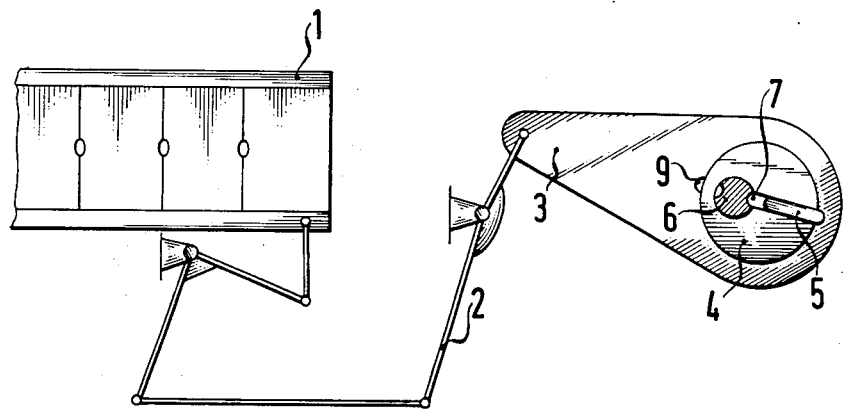
FIG. 1 is a fragmentary, diagrammatic view of a model or pattern of a shaft drive in the lower shed position or setting.

Referring now to the figures of the drawings in detail and first, particularly, to FIG. 1 thereof, there is seen a shaft 1 which is moved into the lower shed position by a connecting rod 3, through a linkage 2.

Figure 2:
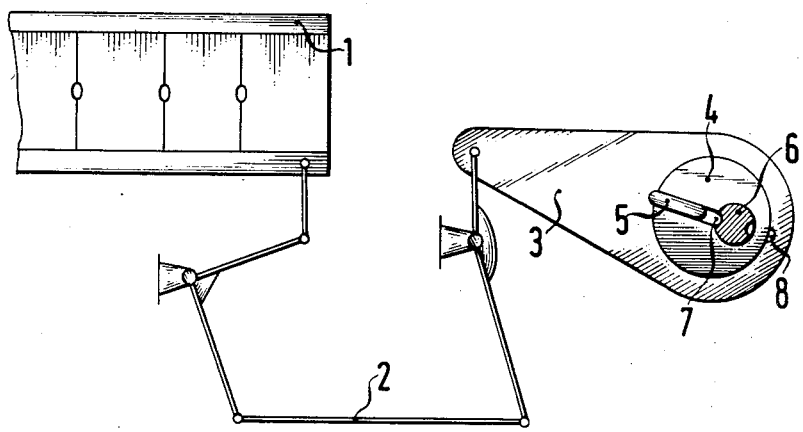
FIG. 2 is a view similar to FIG. 1 of a model or pattern of a shaft drive in the higher shed position or setting.

The connecting rod 3 is supported on an eccentric disk 4. A coupling wedge 5 arrests or retains the eccentric disk 4 against the connecting rod 3. A drive shaft 6 can freely rotate without engaging the eccentric disk 4. However, if the coupling wedge 5 is moved radially, so that it engages in a detent groove 7 of the drive shaft 6, the eccentric disk 4 moves through 180 degrees, until the coupling wedge 5 engages in the second of two detent positions 8, 9 of the connecting rod 3. In this way the connecting rod 3 moves the shaft 1 into the higher shed position shown in FIG. 2, and the drive shaft 6 can rotate freely again.

According to FIGS. 3 to 8, the coupling wedge 5 is provided with an open shifting or switching groove 10. According to FIGS. 10 to 13, two control or shifter pieces 11, 12 of control or shifter rods 13, 14, respectively, are engageable in the groove 10. Details of the coupling wedge 5 will be described below.

According to FIGS. 10 to 13, the two control rods 13 and 14 are pivotably supported on fixed axes 15, 16, and they are supported at their outer ends by slide bearings 17, 18 connected to a control rod 19, which can slide longitudinally. The control rod 19 articulates with a balance beam 20. Two thin plates 21, 22 are hinged to the balance beam 20 and are connected to feeler needles 23, 24, respectively. The feeler needles 23 and 24 scan or probe a paper card 25 which is guided on a card cylinder 26 having openings through which the needles pass.

As the scanning needles 23, 24 pass through the holes in the paper card 25, these needles extend into the card cylinder 26, and thereby cause the thin plates 21 and 22 to fall against followers 27, 28, which alternatingly move back and forth.

The control rod 19 is pulled to the left by a compression spring 29. The compression spring 29 is braced against a fixed support 30 and against the sliding bearing 18. The sliding bearings 17 and 18 are spring mounted on the control rod 19 by the interposition of collars 31 to 34 and compression springs 35, 36, in order to transfer the result of the scanning performed by the needles 23, 24 onto the coupling wedge 5. The balance beam 20 is in a rest position at least at one of the two fixed supports 37, 38.

Figure 10:
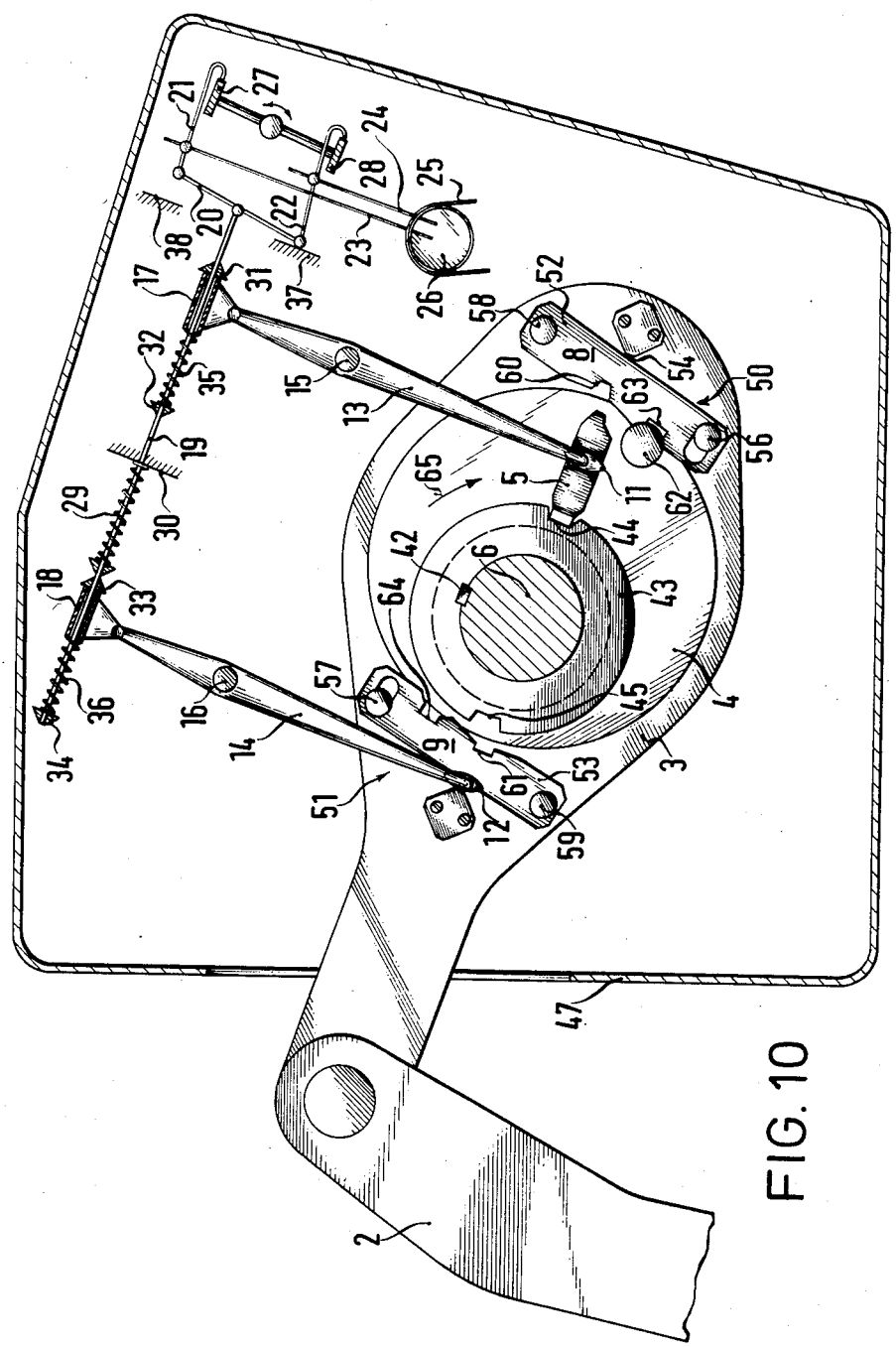
FIG. 10 is a fragmentary, partially cross-sectional view of a rotary dobby or heald machine leaving the lower shed position or setting.
Figure 13:
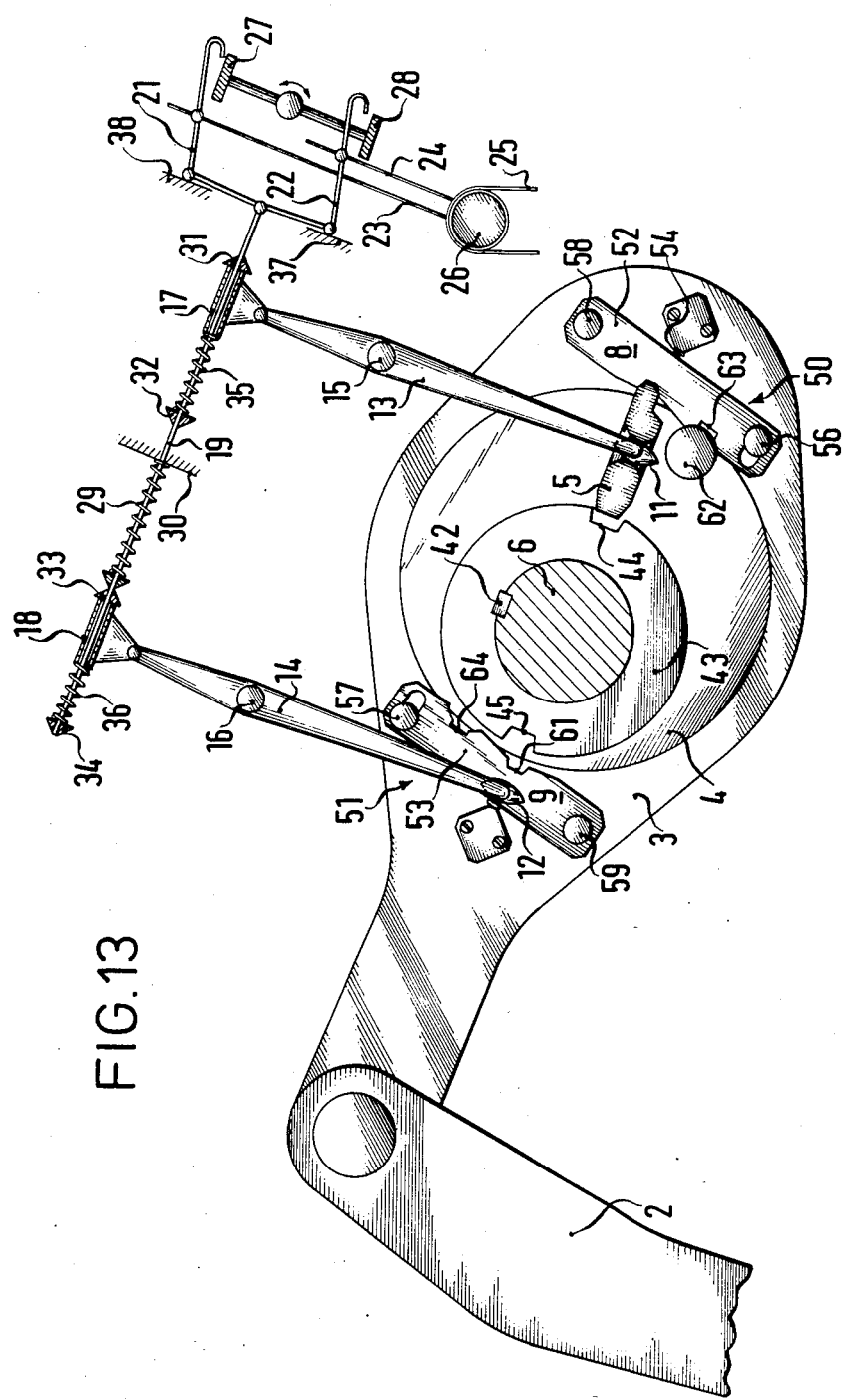
FIG. 13 is yet another view similar to FIGS. 10–12, showing the machine when reaching the lower shed position again.

According to FIGS. 10 and 13, the two wedge-detent positions 8, 9 which lie diametrically opposite each other, are provided with automatic zero setting apparatus 50, 51, respectively, which work in conjunction with the eccentric disk 4. The eccentric disk 4 is in the zero position during a short time interval when the drive shaft 6 is not rotating and the wedge 5 is able to be shifted.

Figure 5:
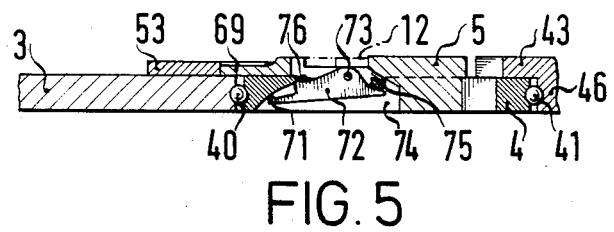
FIG. 5 is a fragmentary, longitudinal-sectional view of the coupling wedge.
Figure 6:
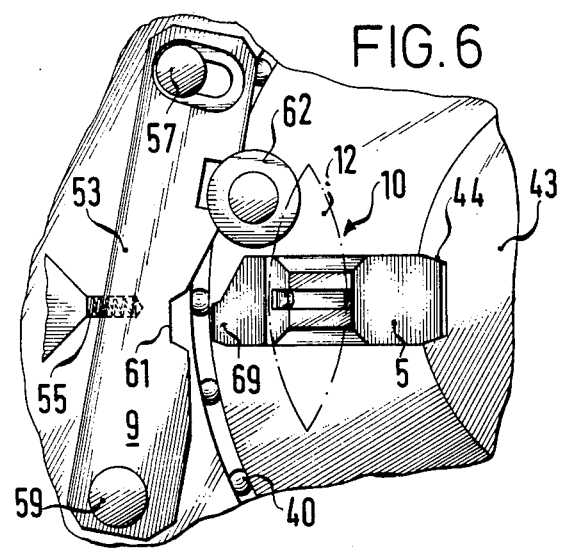
FIG. 6 is a view similar to FIG. 3 of the coupling wedge in the engaged state.

The eccentric disk 4 is freely movably supported in the connecting rod 3 with the aid of roller bearings 40, shown in FIGS. 3 to 9. According to FIGS. 10 to 13, a disk 43 is fixed to the drive shaft 6 by means of a key 42. The disk 43 is provided with two diametrically opposite grooves 44, 45 for the coupling wedge 5. As shown in FIG. 5, the eccentric disk 4 is freely movably supported on a concentric shoulder 46 of the disk 43 through the use of a roller bearing 41 which is shown in FIGS. 4, 5 and 7 to 9.

The above-mentioned parts are disposed in the interior of a housing 47 which is shown in an open condition in the drawing. The connecting rod 3 extends from the housing 47 in order to connect with the linkage 2.

Figure 14:
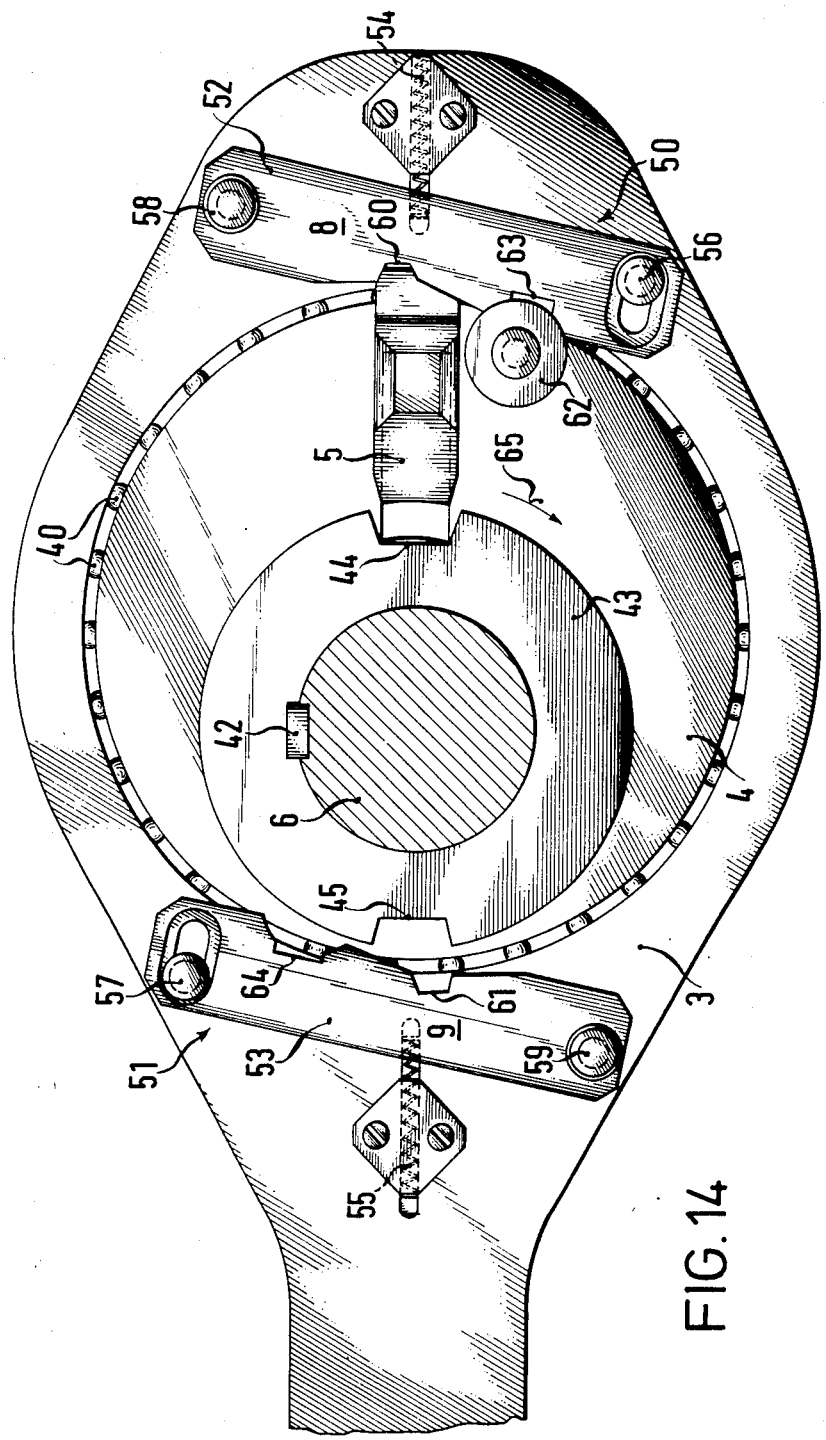
FIG. 14 is a fragmentary, enlarged, partly cross-sectional view of the machine in the lower shed position.

As shown especially clearly in FIG. 14, the automatic zero setting apparatus 50 is provided with a detent device 52, which is in the form of a swing arm which is loaded by a spring 54, which works together with a stop 56 and which can be engaged or disengaged from the connecting rod 3. The swing arm 52 is pivotably supported at a pivot point 58, on the connecting rod 3. In the same way, the other automatic zero setting apparatus 51 is provided with a detent device 53 in the form of a swing arm which can be engaged and disengaged from the connecting rod 3. The swing arm 53 works together with a stop 57 and is pivotably supported at a pivot point 59 on the connecting rod 3. The swing arm 53 is loaded by a spring 55.

The detent device 52 has a detent 60, and the detent device 53 has a detent 61, for the coupling wedge 5.

The two detent devices 52, 53 can be engaged and disengaged by the eccentric disk 4 in the following manner: The eccentric disk 4 is provided with a control element 62 which is formed of a rotatable roller mounted on the eccentric disk 4, which acts in conjunction with the respective detent device 52, 53 of the connecting rod 3. The detent devices 52, 53, respectively, are each provided with a zero setting detent 63, 64, respectively, which function in conjunction with the control roller 62.

Figure 15:
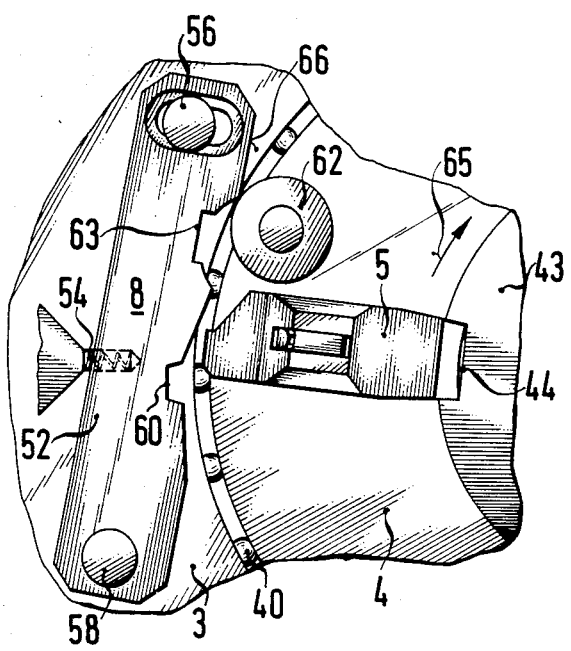
FIG. 15 is a view of a portion of the device shown in FIG. 14, showing the machine beginning to leave the lower shed position.

If the connecting rod 3 is to be moved from the lower shed position shown in FIG. 14 to the higher shed position, (in a manner which will be explained below), the coupling wedge 5 is withdrawn from the detent 60 toward the left and is engaged in the detent 44 of the disk 43, which is connected to the drive shaft 6 by a key 42. While the drive shaft 6 is not rotating, the force of the spring 54 is sufficient to hold the detent device 52 in position with the control element 62 in the detent 63 and to prevent relative rotation between elements 3 and 4 due to gravity or vibration. Further rotation of the drive shaft in the direction of the curved arrow 65, causes the control element 62 disengage the detent device 52 by rolling along the inner contour 66 of the detent device or swing arm 52 according to FIG. 15, thereby lifting the swing arm, so that it looses contact with the stop 56, as shown in FIG. 15. When the control element 62 looses its contact with the inner contour 66, the detent device 52 is automatically engaged again by the action of the spring 54. The control element 62 passes under the rods 23, 14 because it is only approximately as thick as the shifter pieces 11, 12.

By studying FIG. 15 it becomes clear that the control element 62 is also active when the coupling wedge 5 enters the detent 60. When moving into the detent position, the control element 62 makes contact with the inner contour 66 adjacent the pivot point 58, so that the swing arm 52 is lifted against the force of the spring 54. This results in the disengagement of the detent device 52, which is only engaged again when the control element 62 reaches the zero setting detent 63, and the wedge detent position 8 is therefore fixed in the zero position of the connecting rod 3 and the eccentric disk 4.

Correspondingly, the same applies for the function of the detent device 53.

The coupling wedge 5, which is especially clearly shown in FIGS. 3 to 9, is supported in the wedge guide 49 of the eccentric disk 4, so that it can slide longitudinally. The wedge guide 49 is an approximately rectangular perforation in the eccentric disk 4, which according to FIG. 4 extends radially outwardly forming a sliding surface 70 of limited width. The sliding surface 70, according to FIG. 5, serves as a sliding surface for an engagement nose 71 of a locking pawl 72. The locking pawl 72 pivots about an axis 73 in an opening 74 formed in the coupling wedge 5, and is loaded by a compression spring 75. The locking pawl 72 is also provided with a cam surface 76.

Figure 7:
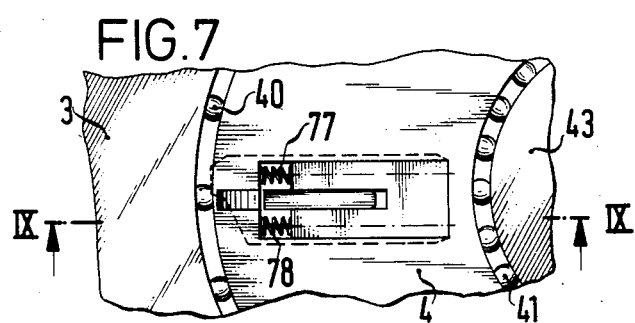
FIG. 7 is a rear view similar to FIG. 4 of the coupling wedge in the engaged state.
Figure 9:
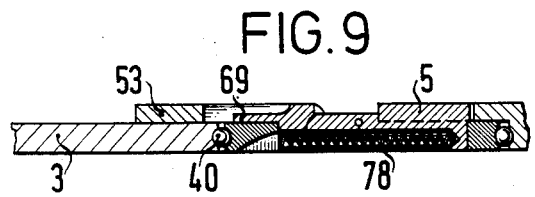
FIG. 9 is a longitudinal-sectional view of the coupling wedge taken along the line IX—IX in FIG. 7, in the direction of the arrows.

Certain portions of the coupling wedge 5 lie on the eccentric disk 4 and certain portions on the connecting rod 3. This relates to lateral portions 67, 68 which serve to guide the wedge, and a detenting portion 69 which serves for engaging in detents 60, 61 of the wedge detent positions 8, 9. FIGS. 7 and 9 indicate that the coupling wedge 5 is provided with two longitudinal bores or holes in which compression springs 77, 78 are respectively retained. The compression springs have one end which bears against the coupling wedge 5 and another end which bears against the radially outwardly positioned wall of the wedge guide 49. The springs try to slide the coupling wedge in the direction toward the drive shaft 6.

Figure 8:
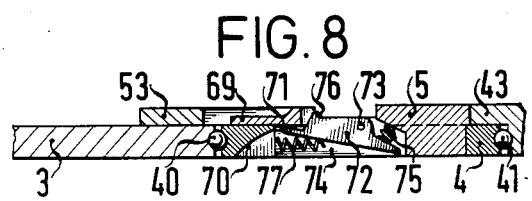
FIG. 8 is a view similar to FIG. 5 of the coupling wedge in the engaged state.

In the lower shed position shown in FIG. 10, the scanning needles 23 and 24 have found holes in the paper card 25, so that the thin plates 21 and 22 are pulled down against the followers 27 and 28. The followers therefore act on the balance beam 20, and lift it alternatingly from the supports 37 and 38. The control rod 19 is therefore pulled toward the right, as shown in FIG. 10. The control rod 19 thus takes along the control rods 13 ad 14, so that the coupling wedge 5 is pulled out of the wedge detent 8 and engages the detent groove 44 of the disk 43. The engagement takes place when the disk 43 is not moving, because the drive shaft 6 stops its rotation after each half turn for a short moment. FIGS. 7 to 9 show the position of the coupling wedge 5 in the engaged state, after the control pieces 11, 12, respectively, have slipped out of the control groove 10. The engagement nose 71 of the locking pawl 72 is engaged behind the radially outer limiting wall of the wedge guide 49, so that the coupling wedge 5 is held securely in the detent groove 44, not only by the force of the springs 77, 78, but also by mechanical locking means, even if centrifugal forces are acting on the coupling wedge 5, during subsequent rotation of the eccentric disk 4.

Figure 3:
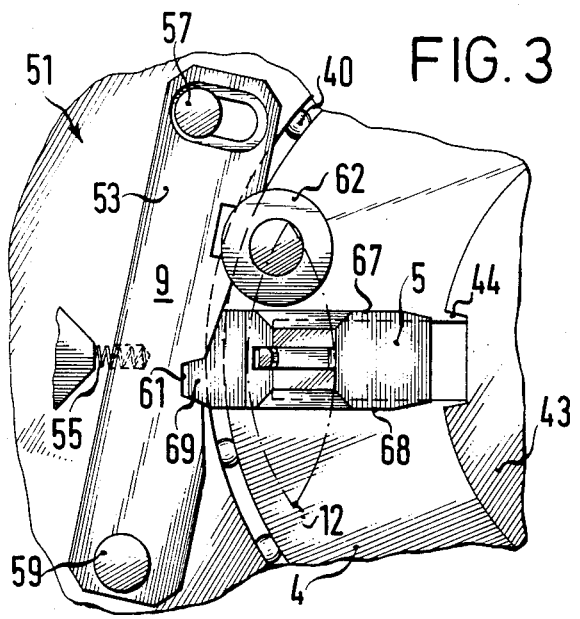
FIG. 3 is a fragmentary, front-elevational view of the engaged coupling wedge.
Figure 4:
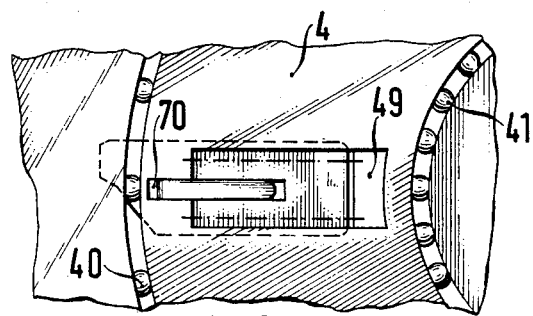
FIG. 4 is a fragmentary, rear-elevational view of the coupling wedge.
Figure 11:
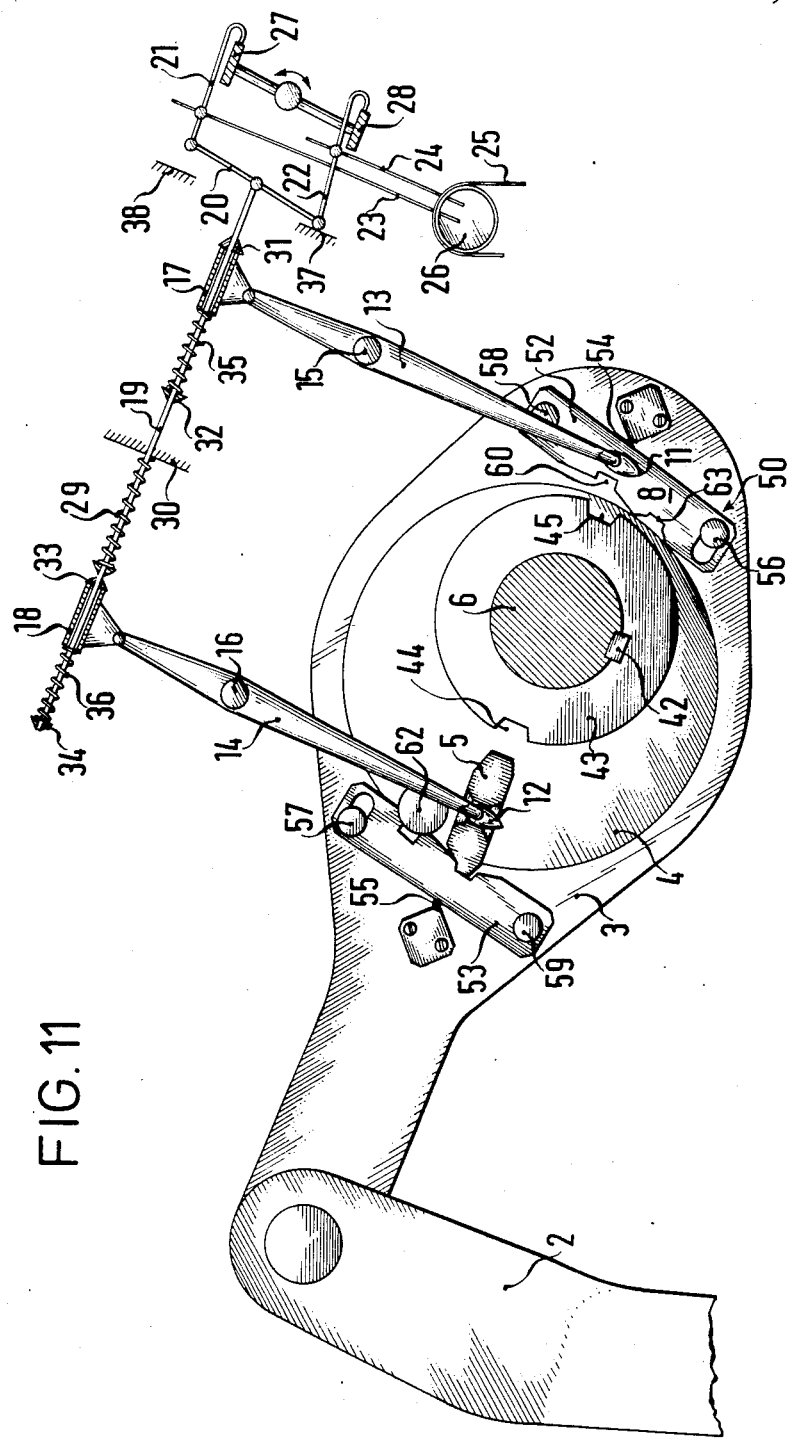
FIG. 11 is a view similar to FIG. 10, showing the machine after reaching the higher shed position or setting.

As the drive shaft 6 continues to rotate in the direction of the arrow 65, the control element 62 disengages the detent device 52 for the time being, as shown in FIG. 15. The control element 62 then first disengages the detent device 53 and only re-engages it again when the zero setting has been reached, so that the coupling wedge can engage itself without friction. This is accomplished in the following manner: After about a half turn of the eccentric disk 4, the control piece 12 finds its way into the control groove 10 of the coupling wedge 5, unlocks the locking pawl 72 by pressing down the cam surface 76, and directs the coupling wedge 5 into the detent 61 of the wedge detent position 9. The higher shed position which is illustrated in FIGS. 3 and 11 has thus been reached.

Figure 12:
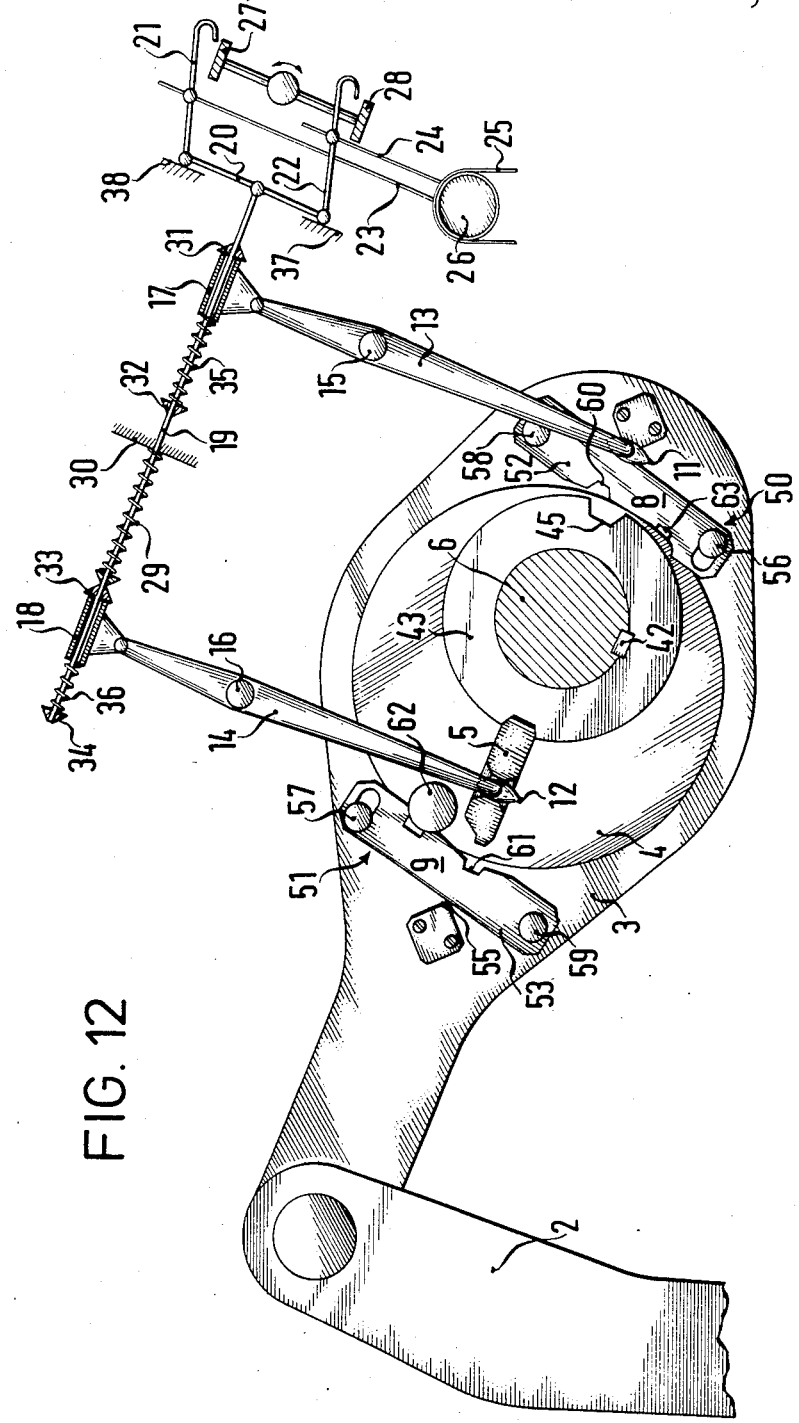
FIG. 12 is another view similar to FIGS. 10 and 11, showing the machine when leaving the higher shed position or setting.

The higher shed position is maintained until, according to FIG. 12, the scanning or feeler needles 23, 24 are retracted from the card cylinder and come to rest on the paper card 25.

In this way, the thin plates 21, 22 loose contact with the followers 27, 28, so that the balance beam 20 moves toward the stops or supports 37, 38, due to the action of compression spring 29. Simultaneously, the compression spring 29 moves the control rod 19 to the left and the two control rods 13, 14 swing counter clockwise. The control piece 12 of the control rod 14 therefore moves the coupling wedge 5 into one of the two detent grooves 44, 45. In the embodiment according to FIGS. 6 and 12, this happens to be the detent groove 44. The coupling wedge 5 and the eccentric disk 4 are therefore taken along by the rotating disk 43, and the higher shed position shown in FIG. 11 changes to the lower shed position shown in FIG. 13. As long as the two scanning needles 23, 24 cannot fall through, the lower shed position remains unchanged and stable as shown in FIG. 13.

FIG. 5 shows the coupling wedge 5 with the control piece 12 in the engaged position. The control piece 12 has unlocked the locking pawl 72 by depressing the cam surface 76. Under the action of the compression spring 75, the locking pawl 72 is engaged again each time, as soon as a control piece 11 or 12 is withdrawn from the shifting groove 10 after the coupling wedge 5 has become engaged.

During each shifting of the coupling wedge 5, the automatic zero setting apparatus ensures that there is no relative motion between the connecting rod or crank and the eccentric disk. Coupling or shifting disturbances are therefore prevented.

The invention is not limited to the illustrated and described embodiment which was used as an example.

We claim:

1. Rotary dobby for moving a shaft, comprising a connecting rod connected to the shaft to be moved, said connecting rod having two mutually-opposite wedge detents disposed thereon, an eccentric disk carried on said connecting rod having a wedge guide extended radially in said eccentric disk, a drive shaft assembly having at least one detent groove formed therein, a coupling wedge disposed between said drive shaft assembly and said eccentric disk, said coupling wedge having an open shifting groove formed therein, two control pieces engageable in said shifting groove, two control rods each being connected to a respective one of said control pieces and being controlled according to a given pattern for pushing one of said control pieces into said shifting groove and for pushing said coupling wedge alternately into said detent groove along the length of said wedge guide when said drive shaft assembly is not rotating and into one of said two wedge detents, and a detent device disposed on said connecting rod and associated with said wedge detents functioning in cooperation with said eccentric disk for maintaining said connecting rod and said eccentric disk in a zero position for receiving said coupling wedge.

2. Rotary dobby according to claim 1, wherein said drive shaft assembly includes another disk having said detent groove formed therein.

3. Rotary dobby according to claim 1, wherein said eccentric disk includes a control element functioning in cooperation with said detent device of said connecting rod.

4. Rotary dobby according to claim 3, wherein said detent device of said connecting rod includes a zero setting detent functioning in cooperation with said control element of said eccentric disk.

5. Rotary dobby according to claim 3, wherein said control element is a roller rotatably supported on said eccentric disk.

6. Rotary dobby according to claim 1, wherein said detent device of said connecting rod is in the form of a spring-loaded swing arm cooperating with a stop.

* * * * *